United States Patent [19]
Schmitt et al.

[11] 3,948,837
[45] Apr. 6, 1976

[54] STABLE POLYURETHANE DISPERSIONS AND METHOD THEREFOR

[75] Inventors: Karl Schmitt; Josef Disteldorf, both of Herne; Werner Flakus, Recklinghausen, all of Germany

[73] Assignee: Veba-Chemie AG, Gelsenkirchen-Buer, Germany

[22] Filed: May 20, 1974

[21] Appl. No.: 471,722

[30] Foreign Application Priority Data
May 22, 1973 Germany.............................. 2325825

[52] U.S. Cl...................... 260/29.2 TN; 260/75 NH
[51] Int. Cl.²...................... C08G 18/32; C08J 3/00
[58] Field of Search.............................. 260/29.2 TN

[56] References Cited
UNITED STATES PATENTS

| | | | |
|---|---|---|---|
| 3,438,922 | 4/1969 | Veno et al................... | 260/29.2 TN |
| 3,438,940 | 4/1969 | Keberle et al............... | 260/29.2 TN |
| 3,442,843 | 5/1969 | Keberle et al............... | 260/29.2 TN |
| 3,461,103 | 8/1969 | Keberle et al............... | 260/29.2 TN |
| 3,723,372 | 3/1973 | Wakimoto et al........... | 260/29.2 TN |
| 3,756,992 | 9/1973 | Dieterich..................... | 260/29.2 TN |

*Primary Examiner*—Murray Tillman
*Assistant Examiner*—Arthur H. Koeckert
*Attorney, Agent, or Firm*—Burgess, Dinklage & Sprung

[57] ABSTRACT

Stable, cross-linked polyurethane aqueous dispersions are prepared by
i. reacting branched polyesters having terminal hydroxyl groups and 3-isocyanto-methyl-3,5,5-trimethylcyclohexyl isocyanate in inert solvents at temperatures of from 10° to 50°C, said isocyanate being used in an amount such that there are from 1.4 to 2.0-NCO equivalents per —OH group equivalent;
ii. reacting the initial reaction product from (i) with primary or secondary diamines or diols in an amount such that from 30 to 70% of the —NCO group present in said initial reaction product are reacted;
iii. reacting the second reaction product from (ii) with aqueous solutions of sodium salts of monobasic aminoacids such that from 15 to 30% of the —NCO group present in said second reaction product are reacted; and
iv. removing the inert solvent by distillation.

4 Claims, No Drawings

STABLE POLYURETHANE DISPERSIONS AND METHOD THEREFOR

BACKGROUND

This invention relates to a highly cross-linked polyurethane aqueous dispersions which produce coatings having excellent properties such as fastness to light. The invention also relates to a method of preparing such dispersions which are characterized by excellent shelf life.

Numerous examples are known for the preparation of aqueous polyurethane dispersions.

These are very largely so-called amine-lengthened polyurethane-urea systems of linear structure with, in some cases, variable molecule segment pairing.

Systems of this kind are efficient, particularly in the field of highly flexible substrate coating, for example substrates of textile or similar materials.

For coating of a considerably larger number of other substrates, such as wood, leather, cardboard, metal, concrete, synthetic leather, etc., with aqueous varnish dispersions, the films produced should have a sufficiently high block temperature adapted to technical requirements. Dispersions of polyurethane-urea prepolymers of a strictly linear structure exhibit practically only block or deformation temperatures below 100°C.

The more pronounced the thermoplastic character of a film of varnish even in the range below 100°C, the more clearly will this property result in liability to soiling, adhesion on stacking, and susceptibility to solvents, to mention only a few limitations in application.

Dispersion coatings subjected to the direct irradiation of the sun moreover naturally require great stability to light, and if possible, also a high block temperature.

It was therefore desirable to produce polyurethane dispersions of this kind, based on highly cross-linked polyurethane-prepolymer systems, which could comply with these technical requirements.

The difficulty of preparing dispersions of highly-cross-linked polyurethane prepolymers for the production of highly thermo-stable coatings is sufficiently known. Numerous experiments with appropriate diisocyanates have been unsuccessful because of the sedimentation of the resulting dispersions either during their actual production, when further processed, or when stored for a short time.

SUMMARY

It has now surprisingly been found possible to produce highly-cross-linked polyurethane dispersions having excellent stability on storage and technical properties desirable in respect of their applications such as color fast to light.

The dispersions are produced in inert solvents at from 10° to 50°C by reacting branched polyesters having terminal hydroxyl groups, or mixtures thereof, and IPDI in such an amount that from 1.4 to 2.0 —NCO equivalents are obtained per OH group equivalent. The polyester-IPDI initial reaction product is further reacted with primary or secondary diamines or diols, in amounts such that from 30 to 70%, preferably from 40 to 50% of the —NCO groups present in the initial reaction product are reacted, and a further reaction of from 15 to 30% of the —NCO groups takes place with aqueous solutions of sodium salts of monobasic aminoacids, followed by removal of the inert solvent by distillation.

IPDI is the abbreviation for 3-isocyanatomethyl-3,5,5-trimethylcyclohexylisocyanate.

DESCRIPTION 3-isocyanomethyl-3,5,5-trimethylcyclohexylisocyanate, used as isocyanate component, and also known as isophorone diisocyanate (or IPDI), proved to be a particularly advantageous reaction component having regard to the efficiency of varnish systems of this kind which is demanded by the market. The special suitability of this diisocyanate in combination with branched polyesters containing terminal hydroxyl groups results from the structural peculiarity of this cycloaliphatic compound, which is subject to stericly hindered by virtue of the formula

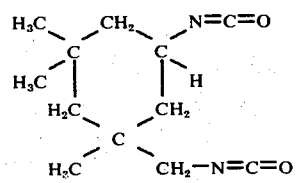

Thus, at room temperature the side chain aliphatic-NCO group exhibits reactivity approximately ten times as great as the isocyanate group directly substituted on the ring carbon.

For the reaction with IPDI, branched polyesters having terminal hydroxyl groups and based on mixtures of aliphatic and aromatic dicarboxylic acids and polyols are used. The dicarboxylic acid mixture is made up of aliphatic diacids to the extent of from 15 to 85 mole %, preferably from 20 to 80 mole %, the remainder being aromatic acids. Branched polyesters are those containing more than two —OH groups per molecule. The branching of the polyester is achieved by using, in addition to the major amount of polyols which are diols, polyols containing more than two hydroxyl groups, the proportion of which should be at least 5 mole %.

Polyesters in which either the acid component or the alcohol component is distinguished by a certain hydrophily are particularly suitable. Polyesters containing tin are particularly suitable.

Suitable aliphatic dicarboxylic acids are in particular those containing at least 4 carbon atoms, such as succinic acid, glutaric acid, adipic acid, suberic acid, sebacic acid, azelaic acid, etc. The aromatic acid component may for example be one of the following dicarboxylic acids: phthalic, isophthalic, and terephthalic acid, and so on. These acids may also have one or more $C_{1-6}$ alkyl substituents, such as alpha, alpha, gamma and/or alpha, gamma, gamma-trimethyladipic acids. Mixtures of acids may also be used.

Aliphatic diols having terminal primary -OH groups and in which the central carbon atoms may be $C_{1-8}$ alkyl substituted are suitable for producing the polyesters containing terminal hydroxyl groups. Central carbon atoms suitable do not carry primary —OH groups. Suitable diols can have the formula:

in which $n \geq 0$ and R hydrogen, an alkyl radical preferably a $C_1$ to $C_4$ radical, or two alkylene radicals which are joined together by oxygen, such as ethylene glycol, propylene glycol-(1,3), butanediol-(1,4), pentanediol-(1,5), hexanediol-(1,6), triethylene glycol, and also the single and multiple alkyl-substituted derivatives, 2,2 dimethylpropanediol-(1,3), 2,2,4- or 2,4,4-trimethyl-hexanediol-(1,6) and so on, and also mixtures of these diols.

The branching of the polyesters is achieved by partial replacement of the diols by polyols having more than two hydroxyl groups, such as triols or tetraols. The replacement of the diols or other polyols may be effected in amounts such that from 5 to 50 mole % of the hydroxyl groups originate for example from such trihydric or polyhydric polyols. For the purpose of creating the branching, polyols of the following formula are suitable:

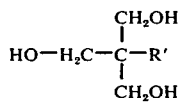

in which R' may be an alkyl radical, preferably a $C_1$ and $C_2$ radical, or a methylol radical, such as 1,1,1-trimethylolethane, 1,1,1-trimethylolpropane, pentaerythrite and so on.

In the production of polyesters, dicarboxylic acids may also be used in the form of functional derivatives, such as the corresponding esters and the pure and mixed acid anhydrides. When esters are used, those of short-chain alcohols are particularly preferred, such as the corresponding methyl, ethyl, n- and i-propyl, and also n- and i-butyl esters.

In the production of oxyesters (polyesters), polyols and dicarboxylic acids are used in amounts such that from 1.2 to 1.75 hydroxyl groups occur per carboxyl group.

Tin esters, tin ester oxides, tin alkyl esters, tin halides, and the like, such as di-n-butyl tin oxide, di-n-butyl tin dilaurate, tin tetrachloride, tin dichloride, tin diisooctate, tin diformiate, and so on, are suitable for incorporating tin in the polyesters. Tin compounds are used in amounts such that the polyester containing terminal hydroxyl groups contains tin in amounts of from 0.01 to 0.5% by weight.

The branched polyesters containing terminal hydroxyl groups and having tin in the polyester molecule can be produced in the conventional manner. The following process may, for example, be employed for this purpose.

The starting material comprises dicarboxylic acids or their anhydrides. The ratio of the equivalents of acids to alcohol naturally depends on the desired molecule size and on the -OH number to be obtained. The reaction components are first heated without a catalyst in a suitable apparatus through which an inert gas, for example nitrogen, is passed. The first separation of water takes place at about 140°C. The water is removed from the reaction mixture by distillation. Within a few hours the reaction temperature is raised to 210°C. When from 60 to 70% of the theoretical separation of water has been achieved, esterification is continued after addition of the tin compound, preferably di-butyl tin oxide. The reaction is terminated after from 10 to 24 hours. Oxyesters produced in this way are characterized by a defined degree of condensation and by reproducible physical data, while in addition to the reaction with IPDI at room temperature they lead to reproducible isocyanate adducts which are stable to storage — a point which is of the greatest importance in respect to the quality of the resulting dispersion.

In order to continue the reaction the oxyester is to a large extent freed of water by brief vacuum treatment, until its water content amounts to 0.02 % by weight. After the OH number and water content have been determined, the oxyesters are reacted with IPDI in the solvents indicated below in the equivalence ratio of —OH to —NCO of 1 : 1.4–2.0, with cooling in the cold state, preferably at from 20° to 30°C. The reaction is effected without a catalyst in the case of polyesters containing tin, or in the case of polyesters containing no tin, in the absence of the usual catalyst in one or optionally more additions. The formation of the adduct may also advantageously be effected with a mixture of a linear oxyester having a mean molecular weight of from 1000 to 2000 and a trifunctional oxyester of a mean molecular weight of from 100 to 1000, preferably from 100 to 500, or of triols.

The reaction is carried out in inert solvents, which are chemically inert in relation to the isocyanate group. Ketonic solvents such as acetone are particularly preferred for the reaction.

In order to obtain specific properties the IPDI adducts or mixtures of different IPDI adducts produced in this way are subjected, in solution with diols or diamines having primary or secondary OH or $NH_2$ groups, to chain-lengthening cross-linking. For this purpose, from 30 to 70 %, preferably from 40 to 50 %, of the —NCO groups are first reacted. The diols used are preferably ethylene glycol, butanediol-1,4, butyleneglycol, hexanediol-1,6, 2,2,4- or 2,4,4-trimethylhexanediol-1,6, diethyleneglycol, triethyleneglycol, and the like.

Mixtures of these substances may also be used.

The diamines used may be ethylene diamine, hexamethylene diamine-1,6, preferably 2,2,4- or 2,4,4,-trimethylhexamethylene diamine-1,6 (1 : 1 mixture also known as TMD), and also 3-aminomethyl-3,5,5-trimethylcyclohexylamine, which is also called isophoronediamine or IPD, as well as disecondary diamines, such as N,N'-bis-(isobutyl)-isophoronediamine, N,N'-bis-(isobutyl)-2,2,4- or 2,4,4-trimethylhexamethylenediamine-1,6, and the like.

This reaction is carried out under known conditions.

In contrast to similar adducts with other isocyanates, the IPDI adducts cross-linked and subjected to chain lengthening in this way with diols or diamines are sufficiently stable in ketonic solvents, because of the reaction selectivity resulting from the process, to enable them to be subjected to intermediate storage or passed on direct for further processing.

In the next step of the reaction the lengthened, cross-linked adducts are dispersed in aqueous medium.

Having regard to the degree of cross-linking already achieved and of the resulting molecule chain length it is necessary according to the invention for the emulsifier to be incorporated in statistical distribution, with a narrowly limited chain termination, before the remaining —NCO groups are caused to react, in further chain-lengthening and cross-linking reactions by the water present.

In the present case, all known substances which develop surface active properties can be used entirely nonspecifically as emulsifier, but with the proviso that they enter into chain termination reactions with —NCO groups.

Since the significance of the substances used here for incorporating the chain-terminating emulsifier has been found to be nonspecific, it is immaterial whether use is made for example of the sodium salts of monoamino acids, such as monoaminocarboxylic acids, monoaminosulphonic acids, or monohydroxymonocarboxylic acids, or other similarly constructed compounds of this kind which contain phosphorus or sulphur. For this reason, it is advisable to use a compound which is particlarly readily available technically, such as is obtained in the simplest manner by neutralizing technical ε-caprolactam with sodium hydroxide solution, as the sodium salt of ε-aminocaproic acid, which salt will be used throughout for the sake of simplicity in the experiment examples given below.

The dispersing process is now carried out by reacting from 10 to 25 mole % of NCO fractions still present, with chain termination and the incorporation of emulsifier, so as to form a water-in-oil dispersion, while the remaining 25 to 40 % NCO fractions (referred to the original NCO fraction of the adduct) are subjected by reaction with water to further chain lenghtening, the addition of further water converting the original water-in-oil dispersion into an oil-in-water dispersion.

After removal of the organic solvent fractions by distillation, the dispersions prepared in this manner can be used direct or further processed.

The following may be indicated as particular advantages of the dispersion produced in accordance with the invention:

1. Stability to storage in the range from 5° to 50°C over a period of months.
2. Formation of a high gloss film both at room temperature and at elevated temperature.
3. Block temperatures of films of 100°C, and in some cases 150°C.
4. High color fastness to light of the resulting coating.
5. Excellent mechanical properties of the dispersion coatings.
6. Formation of a high glass film with all appropriate pigments.
7. Use of the products as coatings for leather, wood, concrete, cellular concrete, paper, cardboard, PVC synthetic leather, metal, and similar materials.
8. Good resistance to chemicals.
9. Because of their selective production the dispersions are stable to storage and capable of use without any kind of additional adjuvants.
10. The pigmentation of the dispersions can be effected without problem to form pastes or varnishes over wide PVC ranges (PVC = pigment volume concentration) (5–50%).

The following examples are intended to further illustrate the present invention without limiting same in any manner.

PRODUCTION OF POLYESTERS CONTAINING HYDROXYL GROUPS

Polyester A 164.3 G of adipic acid and 260.0 g of a mixture of 2,2,4- and 2,4,4-trimethylhexanediol-1,6 in the mole ratio of 1 : 1 were esterified. After splitting off from 80 to 90 % of the theoretical amount of water, the esterification was continued to TAN 0.2 by the addition of 0.2 % by weight of DBTO.

After applying a vacuum at 200°C for about 30 minutes, a product was obtained which had a water content of 0.02 % by weight and a hydroxyl value of 140–146 mg KOH/g.

Polyester B

By the method described for oxyesters A, 2 moles of a mixture of alpha, alpha, gamma- and alpha, gamma, gamma- trimethyladipic acid (mole ratio 1:1) 2 moles of triethyleneglycol, and 1 mole of 1,1,1-trimethylopropane were esterified. Hydroxyl value: 224–228 mg KOH/g. Acid number : 1 mg KOH/g.

Polyester C

Similarly to oxyesters A, 1,2 mole of adipic acid and 1.4 mole of a mixture of 2,2,4- and 2,4,4-trimethylhexanediol-1,6 (mole ratio 1 : 1) were esterified. Hydroxyl value: 63–68 mg KOH/g, acid number : 1 mg KOH/g.

Polyester D

Similarly to oxyester A, 3.2 moles of adipic acid and 4.2 moles of a mixture of 2,2,4- and 2,4,4-trimethylhexanediol-1,6 (mole ratio 1 : 1) were esterified. Hydroxyl value : 109–114 mg KOH/g, acid number : 1 mg KOH/g.

Polyester E

Similarly to oxyester A, 3 moles of phthalic acid, 2 moles of adipic acid, 5 moles of hexanediol-1,6 and 2 moles of 1,1,1-trimethylopropane were esterified. Hydroxyl value: 224–229 mg KOH/g.

PREPARATION OF THE OXYESTER-ISOCYANATE ADDUCTS

Adduct A'

1000 G of oxyester A were dissolved in 1417 g of acetone and within a period of 5 hours introduced into a vessel containing 417 g IPDI while cooling, stirring, and with the exclusion of moisture.

The reaction mixture was then stirred for a further period of 12 hours and analyzed. NCO number : 1.70 %.

Adduct B'

1000 G of oxyester B were dissolved in 1820 g of acetone and reacted with 820 g of IPDI similarly to the formation of adduct A'. NCO number: 3.78 %.

Adduct C'

1000 G of oxyester C were mixed with 42 g of 1,1,1-trimethylolpropane and reacted with 427 g of IPDI, in 1469 g of acetone, in accordance with the preparation of adduct A'. NCO number : 2.44 %.

Adduct D'

1000 G of oxyester D in 1392 g of acetone and 392 g of IPDI were reacted as in the case of the formation of adduct A'. NCO number: 2,36 %.

VARNISH DATA OF DISPERSION 1

Dispersion 1 was applied at room temperature by means of a coating frame on steel sheets or a thickness of 1 mm (so-called Erichsen sheets) and allowed to dry completely at a relative himidity of from 40 to 60 % and a temperature of 20°C (cold hardening) and at elevated temperature (hot hardening). The following technical data were determined:

| | |
|---|---|
| Pendulum hardness (Konig test) | 41 sec. |
| Erichsen impression | 11 mm |
| Cross hatch test | 0 |
| Thickness of coating | 30 μ |

The dispersion is suitable for coating leather, PVC synthetic leather, cardboard, concrete, gas concrete, metal, wood, and so on.

a. After coating and hardening (depending on substrate) in 5 minutes at 75°C (leather) in 5–10 minutes at 100°C (cardboard, metal) the material is stackable after cooling.

b. After coating and drying for 24 hours at room temperature stackable material is obtained.

| | |
|---|---|
| Resistance to chemicals: | satisfactory |
| Adhesion to substrates mentioned: | good |
| Liability to soiling: | slight |
| Impermeability to water: | good |
| Block temperature: | 110°C |

Adduct E'

1000 G of oxyester E in 1802 g of acetone and 802 g of IPDI and also 36 g of 10 weight % DBTL solution were reacted as in the case of the formation of adduct A'. NCO number: 3.70 %.

Adduct F'

1000 G of oxyester B and 237.3 g of IPDI in 1237.2 g of acetone were reacted as in the case of the formation of adduct A'. NCO number: 1.61 %.

Adduct G'

664 G of IPDI, 107.2 g of 1,1,1-trimethylolpropane, 20.4 g of pentaerythrite in 791.6 g of acetone and also 24.3 g of 10 weight % DBTL solution were reacted as in the case of the formation of adduct A'. NCO number: 7.81 %.

EXAMPLES ILLUSTRATING THE INVENTION

EXAMPLE 1 (Dispersion 1)

165 G of adduct A' and 72 g of adduct B' were mixed and 5.9 g of IPD were introduced with rapid stirring; after 10 minutes 10 g of a 30 weight % aqueous solution of the sodium salt of ε-aminocaproic acid were added as emulsifier. After 10 more minutes the reaction was mixed with 184 g of water and the excess of acetone was distilled off at 70°C while stirring.

(The technical properties indicated below were determined in accordance with the applicable DIN standards, that is to say, pendulum hardness according to DIN 53 157, Erichsen impression according to DIN 53 156, and cross-hatch test according to DIN 53 151).

PIGMENTATION OF DISPERSION 1

Varnish data: (after complete hardening)

Coating of Erichsen sheets, as described above, cold and hot hardening.

| | Dispersion 1 (PVC = 10) pigmented with TiO₂, type Kronos Cl 220 | Dispersion 1 (PVC = 5) pigmented with lamp black Type C 101 |
|---|---|---|
| Pendulum hardness (Konig test) | 35 sec. | 38 sec. |
| Erichsen impression | 11 mm | 11 mm |
| Cross-hatch test | 0 | 0 |
| Thickness of coating | 40 μ | 40 μ |
| Gloss 20° | 40 | |
| Gloss 45° | 50 | |
| Gloss 60° | 80 | |

EXAMPLE 2 (Dispersion 2)

200 G of adduct C', 3.9 g IPD, 12.0 g of 30 weight % aqueous solution of the sodium salt of ε-aminocaproic acid and 152 g of water were used in accordance with the production of Dispersion 1. The resulting dispersion had a solid matter content of 40 % by weight.

Varnish data of Dispersion 2: (after complete hardening)

Coating of meatl as described for Dispersion 1; cold and hot hardening.

| | |
|---|---|
| Pendulum hardness (Konig test) | 35 sec. |
| Erichsen impression | 11 mm |
| Cross-hatch test | 0 |
| Thickness of coating | 30 μ |
| Resistance to chemicals | satisfactory |
| Adhesion to substrates mentioned | good |
| Liability to soiling | slight |
| Impermeability to water | good |
| Block temperature | 120°C |

This dispersion is suitable for the same range of application as Dispersion 1.

EXAMPLE 3 (Dispersion 3)

200 G of adduct C', 3.8 g of TMD, 12.0 g of 30 weight % aqueous solution of the sodium salt of ε-aminocaproic acid and 152 g of water were reacted similarly to the procedure indicated for Dispersion 1. The resulting dispersion had a solid matter content of 40 % by weight.

Varnish data of Dispersion 3: (after complete hardening)

Coating of metal as described for Dispersion 1; cold and hot hardening.

| | |
|---|---|
| Pendulum hardness (Konig test) | 35 sec. |
| Erichsen impression | 11 mm |
| Cross-hatch test | 0 |
| Thickness of coating | 30 μ |
| Resistance to chemicals | satisfactory |
| Adhesion to substrates mentioned | good |
| Liability to soiling | slight |
| Block temperature | 120°C |

Applications and hardening conditions as for Dispersion 1, but particularly suitable for leather and PVC synthetic leather.

EXAMPLE 4 (Dispersion 4)

101 G of adduct B', 98 g of adduct D', 6.0 g of TMD, 11.6 g of 30 weight % aqueous solution of the sodium salt of ε-aminocaproic acid and 152 g of water were reacted similarly to the procedure indicated for Dispersion 1. The resulting dispersion had a solid matter content of 40 % by weight.

Varnish data for Dispersion 4 (after complete hardening)

Coating of meatl as described for Dispersion 1; cold and hot hardening.

| Pendulum hardness | 34 sec. |
| --- | --- |
| Erichsen impression | 10 mm |
| Cross-hatch test | 0 |
| Thickness of coating | 30 μ |
| Resistance to chemicals | satisfactory |
| Adhesion to substrates mentioned | good |
| Liability to soiling | slight |
| Impermeability to water | good |
| Block temperature | 150°C |

Applications and hardening conditions as Dispersion 1, special use for wood, metal and PVC.

EXAMPLE 5 (Dispersion 5)

200 G of adduct E', 33.8 g of 30 weight % aqueous solution of the sodium salt of ε-aminocapronic acid, and 141 g of water were reacted similarly to the procedure indicated for Dispersion 1. The resulting dispersion had a solid matter content of 40% by weight.

Varnish data for Dispersion 5 (after complete hardening)

Coating of metal as described in Dispersion 1; cold and hot hardening.

| Pendulum hardness (Konig test) | 170 sec. |
| --- | --- |
| Erichsen impression | 2 mm |
| Cross-hatch test | 4 |
| Thickness of coating | 30 μ |
| Resistance to chemicals | satisfactory |
| Adhesion to substrates mentioned | good |
| Liability to soiling | slight |
| Impermeability to water | good |
| Block temperature | 150°C |

Used for coating wood, concrete, gas concrete, metal. Hardening conditions as Dispersion 1. The resulting dispersions may also be used in mixture form; thus there are many formulations for dispersion 5 mixed with Dispersion 1 or Dispersion 2, Dispersion 3, or Dispersion 4.

EXAMPLE OF FORMULATION

Dispersion 1 and Dispersion 5 were mixed in the ration of 1 : 1.

Varnish data (after complete hardening)

Coating of metal as described for Dispersion; cold and hot hardening

| Pendulum hardness (Konig test) | 78 sec. |
| --- | --- |
| Erichsen impression | 11 mm |
| Cross-hatch test | 0 |
| Thickness of coating | 30 μ |

EXAMPLE 6 (Dispersion 6)

100.0 G of adduct F', 24.8 g of adduct G', 3.7 g of IPD, 6.6 g of 30 weight % aqueous solution of the sodium salt of ε-aminocaproic acid, and 98.0 g of water were reacted similarly to the procedure indicated for Dispersion 1. The resulting dispersion has a solid matter content of 40 weight %.

Varnish data of Dispersion 6 (after complete hardening)

Coating of meatl as described in Dispersion 1; cold and hot hardening

| Pendulum hardness (Konig test) | 43 sec. |
| --- | --- |
| Erichsen impression | 10 mm |
| Cross-hatch test | 0 |
| Thickness of coating | 30 μ |
| Resistance to chemicals | satisfactory |
| Adhesion to substrates mentioned | good |
| Liability to soiling | slight |
| Impermeability to water | good |
| Block temperature | 120°C |

Applications and hardening condtions as for Dispersion 1. Particularly used for PVC, wood, metal, gas concrete.

What is claimed is:

1. Method for producing cross-linked polyurethane aqueous dispersions which comprises
   i. reacting branched polyesters containing more than two —OH groups per molecule and having terminal hydroxyl groups and 3-isocyanto-methyl-3,5,5-trimethylcyclohexyl isocyanate in inert solvents at temperatures of from 10° to 50°C, said isocyanate being used in an amount such that there are from 1.4 to 2.0 —NCO equivalents per —OH group equivalent;
   ii. reacting the initial reaction product from (i) with primary or secondary diamines or diols in amounts such that from 30 to 70% of the —NCO group present in said initial reaction product are reacted;
   iii. reacting the second reaction product from (ii) with aqueous solutions of sodium salts of monobasic aminoacids such that from 10–25% of the —NCO groups present in said second reaction product are reacted with said aminoacids; and
   iv. removing the inert solvent by distillation.

2. Method of claim 1 wherein the diamine is 3-aminomethyl-3,5,5-trimethylcyclohexylamine.

3. Method of claim 1 wherein the branched polyesters contain tin.

4. Polyurethane dispersion produced by the method of claim 1.

* * * * *